Oct. 2, 1945.  E. McKABA  2,385,827
HYPERBOLIC CURVE PLOTTING APPARATUS
Filed Nov. 27, 1943
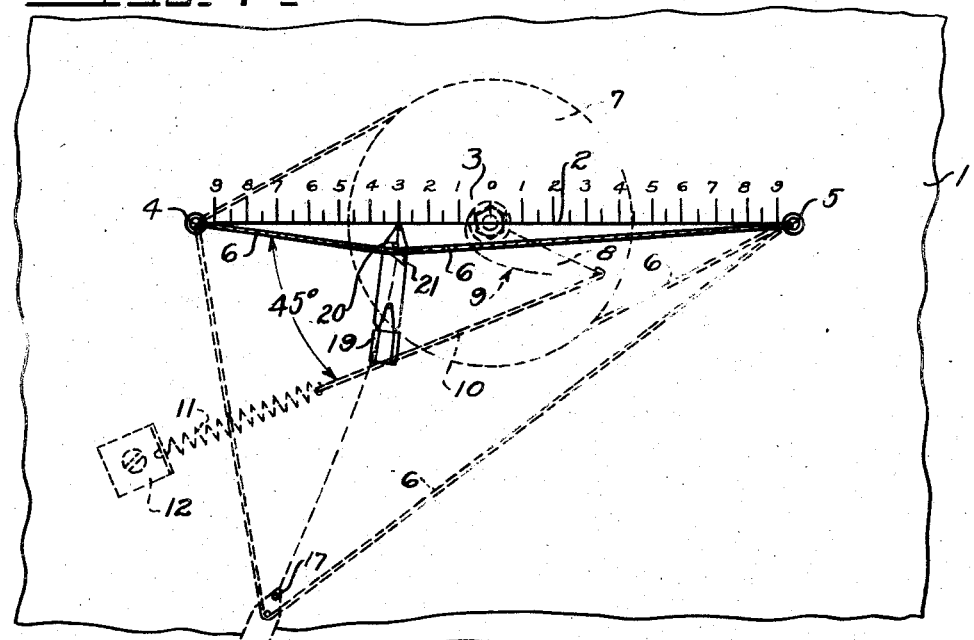
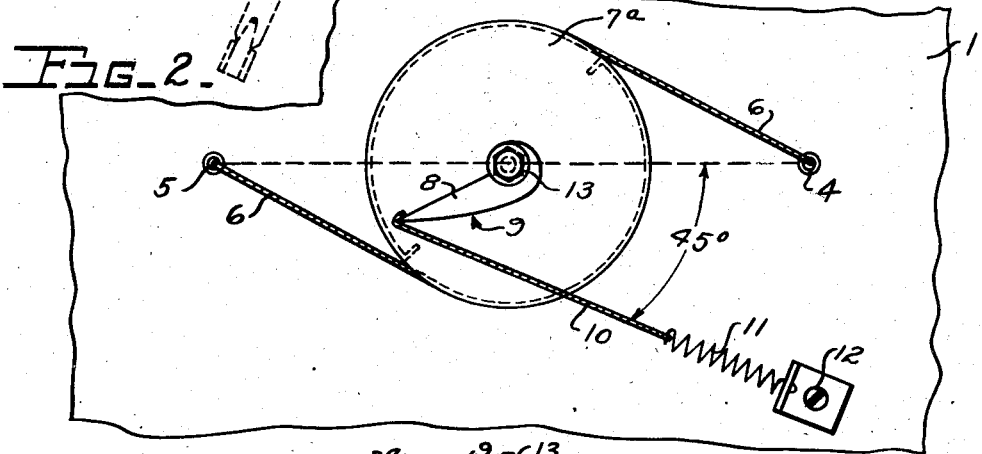
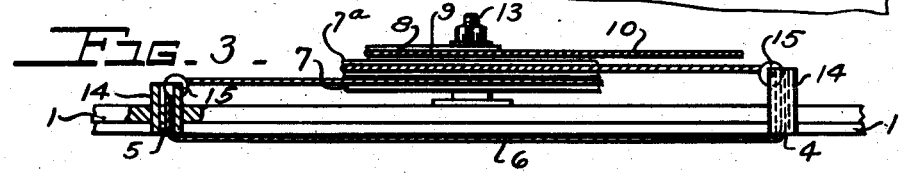
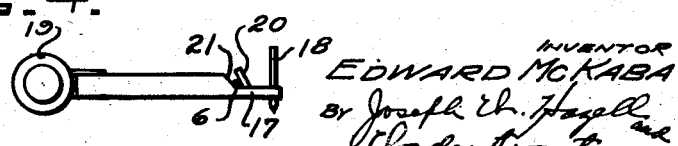
INVENTOR
EDWARD McKABA Patented Oct. 2, 1945

2,385,827

UNITED STATES PATENT OFFICE 2,385,827

HYPERBOLIC CURVE PLOTTING APPARATUS

Edward McKaba, Brooklyn, N. Y.

Application November 27, 1943, Serial No. 511,929

6 Claims. (Cl. 33—27)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for drawing geometrical curves, and more particularly to a device for plotting hyperbolas, a curve in which the difference in distance from any point on the curve to two fixed foci is always constant, and has for an object the provision of scale means together with two associated foci points and an associated curve plotting means whereby the constant difference between the foci and curve may be selected on the scale and movement of the curve plotting means will describe a hyperbolic curve.

A principal purpose of this invention is the provision of an apparatus for graphically recording the location of an impact or explosion from a previously obtained sound-ranging record. In this application the time of the arrival of the impact or explosive sound at two or more spaced sound detectors is recorded, and by multiplying the time-difference of the reception of the sound by the velocity of the sound wave, a distance-difference figure is obtained. This distance-difference between the impact and the detectors is set off relative to the scale between two foci points on a plotting surface as the constant of the hyperbolic curve to be drawn. The hyperbola is plotted on the surface by my improved curve describing device, and the relative point of the impact or explosion will be graphically plotted to lie somewhere along this line or curve.

By utilizing a third detector station and plotting a second curve on the plotting surface with the relative positions of the third detector station and one of the other stations as the second pair of foci points on the plotting surface, another line or curve may be drawn, intersecting the first line. The intersection of the two lines, or curves, will graphically indicate on the plotting board the exact impact or explosion point on the plotting surface with relation to the foci points.

A further object is the provision of a simple, inexpensive curve plotting apparatus, including a time-difference reference scale, a single flexible control member associated with said scale at opposite ends thereof, including means for simultaneously and uniformly allowing equal movements only of the control member with respect to the opposite ends of the scale, and scribing means adjustably secured to the flexible control member for adjustment thereon relative to the reference scale.

Other objects and advantages of the invention will become apparent from the following description, taken in connection with the accompanying drawing. in which like reference characters refer to like parts in the several figures.

Figure 1 is a fragmentary plan view, illustrating a portion of a plotting board having my improved curve plotting device applied thereto, the curve plotting device being shown in full lines at the start of a hyperbola plotting operation, and in dotted line at the termination of the said plotting operation.

Figure 2 is a fragmentary rear view of the plotting board, disclosing more particularly the flexible curve plotting means and tensioning means therefor, for causing equal uniform movement of the curve plotting means at the focal points of the hyperbola to be plotted, located at the opposite ends of the scale.

Figure 3 is an edge view of a portion of the plotting board showing the cable and winding drum arrangement, parts being broken away and shown in section; and Figure 4 is a fragmentary detail view of the stylus member.

Referring to the drawing, 1 indicates a curve plotting surface or table having a distance-difference scale delineated thereon, indicated at 2, and relatively representing the distance between two sound detectors located at predetermined spaced points on a bombing field between which points a bomb or explosion is to be recorded. The scale is divided uniformly from a central zero point 3 in opposite directions, representing the mid point between the two sound detectors on the field.

A third sound detector is also preferably placed on the field and spaced from the other detectors at a distance equal to the distance between the first two detectors forming an equilateral triangle between the three detectors, with the point of impact or explosion to be recorded located within the triangle. Four detectors may also be used, if desired, at the four corners of an equal-sided rectangular outline or target area, each side of the rectangle being represented on the plotting board as the distance between the ends of the scale 2.

Located at the opposite ends of the scale, and representing the distance between any two adjacent sound or impact detectors on one side of the triangular or rectangular bombing field and the foci of a hyperbola on the plotting board, are two small apertures or passages 4 and 5 for receiving the elongated flexible plotting member or cord 6. This cord is preferably of a fine non-stretching material, initially drawn taut across the plotting board along the lower edge of the scale 2. The apertures 4 and 5 should closely approximate the diameter of the cord 6 with smoothly rounded entrance portions so the cord will slide freely back and forth through the apertures without binding and substantially no lateral displacement.

The cord 6 passes through the openings 4 and 5, as best seen in Figures 2 and 3, and the opposite end portions of the cord are wound on two cable drums, or disks 7 and 7a, with the ends of the cords secured to the periphery of the drums. The drums are secured together to move as a unit and have their peripheries grooved to receive the plotting cord, the end portion of one cord being wound clockwise on one drum while the end portion of the other cord is wound clockwise on the other drum.

Tension means is provided for rotatably tensioning the drums 7 and 7a, providing a substantially uniform and equal tension on both end portions of the cord 6 extending through the openings 4 and 5 and across the front of the plotting board. This tension means comprises a lever 8, having a cam shaped edge 9, preferably grooved to receive a spring loaded tension cable 10, which is attached at one end to the free end of the lever 8, and at its other end to a tension coil spring 11, secured to a bracket member 12, fastened to the rear of the plotting board 1 in any suitable manner.

The lever 8 is fixed to the two disks 7 and 7a, to rotate therewith as the cord 6 is withdrawn from the drums, and as the tension is increased, due to the expansion of the coil spring 11, when the cord 6 at the front of the plotting board is moved laterally across the plotting surface, the contour of the cam portion 9, receiving the tension cable 10, gradually approached the center of rotation of the arm 8, reducing the leverage effect of the tensioning cable 10 with respect to the center of the disks 7 and 7a in substantially direct ratio to the increase in tension in the spring 11 due to its elongation, thus maintaining the tension on the curve plotting cord 6 substantially constant, so that the force required to pull the plotting cord 6 is not increased as the point selected for plotting is moved farther from the straight line between the apertures 4 and 5.

The cable control unit, consisting of the twin disks 7—7a and the lever 8, is preferably rotatably journalled on a fixed pivot bearing or standard 13, which rotatably supports the unit in spaced relation to the back of the plotting board. The end portions of the cable are brought through the plotting board apertures 4 and 5, into the planes of the cable grooves in the respective disks on which the cable is wound, through tubular conduit members 14, in register with the openings 4 and 5, each conduit member having a pulley 15 journalled in a notch formed in the wall thereof over which the cable 6 is trained.

To plot a hyperbola, the plotting cord 6 is clamped or grasped at any point in its length between the openings 4 and 5, opposite to a desired distance-difference setting selected on the scale 2, and this point on the cable is then drawn across the plotting board 1 with the portions of the cord between the point selected on the cable and the respective cable drums maintained taut as the cable is withdrawn from the drums. The line traversed by the point across the plotting board describes a hyperbola for the distance-difference selected on the scale.

To aid in making a graphic recording of this curve on a sheet placed on the plotting board, a stylus member 16 is preferably used, which may be clamped, or otherwise adjustably secured to the plotting cable 6 at any desired distance-difference point, as selected on the fixed scale 2. The stylus member comprises a body having a pointed end 17 carrying a marking element such as a pen or pencil 18 for drawing the curve on the plotting board when the stylus is displaced downwardly across the board. The stylus body is somewhat elongated, terminating in a handle portion 19, adapted to be grasped between the thumb and forefinger of the hand of the operator, while the cable clamping means for adjustably securing the stylus member to the plotting cable at any desired point, may be any type of clamping means such as that disclosed in the drawing and comprising a pin member 20 projecting from the front face of the stylus body and an associated inclined or camming surface 21 so arranged that the cable may be wedged in between the pin 20 and the inclined surface 21.

In the operation of the device, a sheet of paper is placed under the scale 2, preferably of a relative size and shape representing the edges of the field between the sound detectors from which the distance-difference figure is obtained. When three sound detectors are used, disposed on two sides of a rectangular field, equidistant from a third intermediate sound detector in the corner of the field, a sheet representing the field is first placed on the plotting board or surface with two of its corners coinciding with the openings 4 and 5. Assuming that the relative distance-difference of the impact or explosion of a bomb or shell was at 3 on the scale 2 as recorded by the sound detectors on one side of the bombing field and closer to the sound recording device represented by the opening 4 at the end of the scale 2, the stylus member would be secured to the plotting cord 6, as shown in full lines in Figure 1, opposite 3 and nearer to the opening 4, and then drawn downwardly to the dotted line position in that figure while keeping the longitudinal axis of the stylus member in substantially constant bisecting relation with respect to the angle formed by the portions of the cable 6 at each side of the stylus. The line scribed by the marking member 18 in the end of the stylus member, on the sheet placed on the plotting board is a hyperbola, representing a curved line on the actual bombing field, and the impact point where the bomb or shell landed will be somewhere on this hyperbola, as plotted on the board.

The plotting sheet on the plotting board is now turned to dispose the relative location of the sound detectors represented thereon, for the second pair of detectors, coincident with the openings 4 and 5 in the plotting board and the stylus is now adjusted and secured to the cord 6 to accord with the distance-difference of the sound or impact as recorded by the second set of sound detectors, as indicated on the scale 2. The stylus is now drawn downwardly as before, describing a second hyperbola which will intersect the first drawn hyperbola at some point, and the intersection of the two hyperbolas will record on the plotting sheet on the board, the exact relative location of the impact or explosion with reference to the relative location of the sound recording devices as indicated by the openings 4—5 on the plotting board and the distance-difference figures selected on the scale 2.

What I claim is:

1. In a hyperbola plotting device, a plotting board having spaced plotting cord receiving guide openings formed therein, located at the foci of the hyperbola to be plotted, a hyperbola plotting cord extending between the guide openings with its end portions extending through and beyond the openings, rotary cord movement controlling means mounted on the plotting board comprising a cord winding drum having both end portions of the cord wound around the drum in the same peripheral direction with the ends secured to the drum, resilient means between the drum and said board for rotating the drum to maintain uniform tension on the cord between the guide openings, a distance-difference reference scale between said guide openings, and a marking stylus having means for adjustably securing the stylus to the cord at any point between the cord receiving guide openings opposite a selected distance-difference reference point on the scale, for scribing a hyperbola on the plotting board with the point selected on the scale as the starting point of the hyperbola and the relatively different distances between the said point and the guide openings for the plotting cord constituting the distance between the foci and the hyperbola.

2. In a hyperbola plotting apparatus, a support having a plotting board formed with spaced openings extending through the surface of the board to the rear thereof, located at the foci of the hyperbolas to be plotted, a distance-difference scale between the foci points having indicia thereon divided equally from a central point between the foci toward each of the foci, cable winding drum means rotatably mounted on the rear of the board between the guide openings, spring means for rotating said drum means in one direction, plotting cable means extending across the front of the board along said scale with the end portions of the cable slidably disposed through said guide openings and wound around the winding drum means in the same direction and secured to the drum to oppose rotation of the drum means by said spring means, and a stylus member adjustably secured to the cable means intermediate the spaced cable openings having a stylus point disposed adjacent the cable engaging portion of the stylus member for positioning the stylus on the cable with reference to a selected distance-difference point on the scale.

3. In a hyperbola plotting apparatus, a support having a plotting surface formed with two spaced openings therein and located at the foci points of a series of hyperbolas to be described on the plotting surface, a plotting cord tensioned between the two openings with its end portions extending through the openings to the rear of the plotting surface, an adjustable stylus member adapted to be secured to the cord between the openings, a pair of cable drums rotatably mounted together as a unit on the support in the rear of the plotting surface with the end portions of the plotting cord wound around the drums in the same annular direction and their ends secured to the drums, a lever fixed to the drums for rotation therewith having a cam shaped tension cable receiving edge, a tension cable secured to the outer end of the lever, adapted to traverse the cam shaped tension cable receiving edge when the drums are rotated by the plotting cable and spring tension means between said tension cable and the support for tensioning the tension cable.

4. In a hyperbola curve plotting apparatus, a support having a curve plotting surface formed with spaced cable guide openings extending through the plotting surface, located at the focal points of any hyperbola to be plotted on the plotting surface, a plotting cable tensioned between the openings with its end portions extending through said openings to the rear of said plotting surface, a reference scale disposed on the plotting surface between the two openings, said scale having indicia indicating different focal distances between the two guide openings and hyperbolar curves to be drawn, a cable controlling unit at the rear of said plotting surface comprising a supporting standard, carrying twin cable winding and tensioning disks and an actuating lever for the disks, tension means for rotating said cable controlling unit in one direction comprising spring means secured to the support at one end, and to the disk actuating lever at its other end, said plotting cable having each end portion wound around one of said disks in opposing relation to direction of movement of the disks caused by said tensioning means, whereby the tension means and cable controlling unit maintain the cable means in uniformly taut condition between openings in the plotting surface and cause equal movements of the cable through said opening when a point on the cable between said openings is moved across the plotting surface from any selected point on the scale, and a marking stylus adjustably disposed on plotting cable between said openings, said stylus including a pointer end for registration with the reference scale, and means for securing the stylus to the cable opposite any point on the reference scale, the distances between the point at which the stylus is secured on the plotting cable and the cable receiving openings constituting the location of the foci of the hyperbola to be drawn.

5. In a hyperbola curve plotting apparatus, a support having a curve plotting surface formed with spaced cable guide openings extending through the plotting surface located at the focal points of any hyperbola to be plotted on the plotting surface, a plotting cable tensioned between the openings with its end portions extending through said openings to the rear of said plotting surface, a plotting cable tensioning and controlling unit secured to the rear of said plotting surface comprising a supporting standard fixed to the rear of said plotting surface, concentric twin cable winding and tensioning discs rotatably mounted as a unit on said supporting standard, an actuating lever fixed at one end to the discs, tension means for rotating said plotting cable tensioning discs in one direction comprising extensible elongated spring means secured to the support at one end in spaced relation to the supporting standard, and to the twin cable winding and tension disc-actuating lever at the other end, said plotting cable having each end portion wound around one of said discs and secured thereto in opposite relation to the direction of rotative movement of the twin discs by said tensioning means to maintain the cable taut between the openings in the plotted surface and permit only equal movements of the cable through said openings when any selected point on the cable between said openings at unequal distances from said cable guide openings is moved laterally across said plotting surface to cause said point to describe a hyperbola curve on said plotting surface.

6. In a hyperbola plotting device, a plotting board having spaced plotting cord receiving guide means thereon located at the foci of the hyperbola to be plotted, a hyperbola plotting cord extending between the guide means guidingly received by said guide means, with its end portions extending beyond the guide means, rotary cord movement controlling means mounted on the plotting board comprising cord winding drum means having both end portions of the cord wound around the drum means in the same peripheral direction with its ends secured to the drum, means between the drum means and said plotting board for rotating the drum means to maintain yieldable tension on the cord between the guide means, and a marking stylus having means for adjustably securing the stylus to the cord at any point selected as a starting point of the hyperbola and the relative different distances between the said selected point and the guide means for the plotting cord constituting the distance between the foci and the hyperbola.

EDWARD McKABA.